(12) United States Patent
Shoshani et al.

(10) Patent No.: US 8,834,623 B2
(45) Date of Patent: Sep. 16, 2014

(54) WATER REPELLENT MATERIALS FOR WOOD PRODUCTS

(75) Inventors: Amnon Shoshani, Givat Ada (IL); Irina Glazer, Kiryat Shmona (IL); Daphna Halevy, Tel Aviv (IL); Shai Yosifon, Kiryat Tivon (IL)

(73) Assignee: T.I.P. Ltd., Caesarea Industrial Park (IL)

( * ) Notice: Subject to any disclaimer, the term of this patent is extended or adjusted under 35 U.S.C. 154(b) by 0 days.

(21) Appl. No.: 13/641,181

(22) PCT Filed: Apr. 13, 2011

(86) PCT No.: PCT/US2011/032202
§ 371 (c)(1),
(2), (4) Date: Jun. 19, 2013

(87) PCT Pub. No.: WO2011/130338
PCT Pub. Date: Oct. 20, 2011

(65) Prior Publication Data
US 2014/0000475 A1 Jan. 2, 2014

Related U.S. Application Data

(60) Provisional application No. 61/323,392, filed on Apr. 13, 2010.

(51) Int. Cl.
| | |
|---|---|
| *C08L 91/06* | (2006.01) |
| *C08L 91/08* | (2006.01) |
| *C04B 28/14* | (2006.01) |
| *C04B 24/00* | (2006.01) |
| *C08L 31/04* | (2006.01) |
| *C04B 40/00* | (2006.01) |
| *C08L 95/00* | (2006.01) |
| *C08L 29/04* | (2006.01) |
| *C08L 33/08* | (2006.01) |
| *C08L 97/02* | (2006.01) |
| *C04B 111/00* | (2006.01) |

(52) U.S. Cl.
CPC .............. *C08L 31/04* (2013.01); *C04B 28/14* (2013.01); *C04B 24/00* (2013.01); *C04B 40/0039* (2013.01); *C08L 91/08* (2013.01); *C04B 2111/0062* (2013.01); *C08L 95/005* (2013.01); *C08L 29/04* (2013.01); *C08L 33/08* (2013.01); *C08L 97/02* (2013.01); *C08L 91/06* (2013.01)
USPC ............ 106/164.6; 106/2; 106/270; 106/271; 106/272; 524/60

(58) Field of Classification Search
USPC .............. 106/2, 270, 271, 272, 164.6; 524/60
See application file for complete search history.

(56) References Cited

U.S. PATENT DOCUMENTS

| | | | | |
|---|---|---|---|---|
| 1,544,813 A | * | 7/1925 | Clapp | 162/171 |
| 3,668,064 A | * | 6/1972 | Kucera | 162/171 |
| 5,049,186 A | * | 9/1991 | Kawabata | 106/2 |
| 6,890,976 B2 | * | 5/2005 | Sinnige | 524/5 |
| 6,939,420 B2 | * | 9/2005 | Pollack | 149/2 |
| 7,071,249 B2 | * | 7/2006 | Ho et al. | 524/39 |
| 8,476,345 B2 | * | 7/2013 | Buchholz | 524/74 |
| 2005/0222311 A1 | * | 10/2005 | Richter et al. | 524/275 |
| 2011/0257301 A1 | * | 10/2011 | Stuart et al. | 524/5 |

FOREIGN PATENT DOCUMENTS

| | | |
|---|---|---|
| DE | 10043316 | 3/2002 |
| DE | 102004041032 | 10/2005 |
| DE | 102005035515 | 2/2007 |
| DE | 102005059207 | 6/2007 |
| WO | 98/28239 | 7/1998 |
| WO | 02/098816 | 12/2002 |
| WO | WO2007/147403 A1 * | 12/2007 |
| WO | WO2008/144905 A1 * | 12/2008 |
| WO | 2010/053494 | 5/2010 |

* cited by examiner

*Primary Examiner* — Anthony J Green
(74) *Attorney, Agent, or Firm* — Dekel Patent Ltd.; David Klein

(57) ABSTRACT

A method of manufacturing a wood product including using a water and wax mixture with wood particles in a production process of wood products, wherein the wax mixture includes a hydrocarbon wax, and a water-repellant material selected from the group consisting of (a) an asphaltite, (b) a polyolefin copolymer, (c) a polyolefin synthetic wax, and (d) combinations thereof, and forming a wood product.

9 Claims, No Drawings

WATER REPELLENT MATERIALS FOR WOOD PRODUCTS

CROSS-REFERENCE TO RELATED APPLICATIONS

This application is a national phase patent application of, and claims priority from, PCT Patent Application PCT/US11/32202, filed Apr. 13, 2011, and claims priority under 35 USC §119 to U.S. Provisional Patent Application 61/323,392, filed Apr. 13, 2010.

FIELD OF THE INVENTION

The present invention relates generally to water repellants, such as wax or wax-like substances that are used to impart water repellency and other characteristics to wood products, such as boards or panels and others.

BACKGROUND OF THE INVENTION

Wood and wood composite products are well known. Wood composites are in widespread use in building industry, furniture and other industries. Some examples of specific wood composite products are particleboard, medium density fiberboard (MDF), and oriented strandboard (OSB).

It is known in the prior art to improve the dimensional moisture stability and other properties of the wood product by applying a suitable wax in emulsion or molten form to the wood particles or fibers at some stage in the fabrication process.

It has been found that emulsions of a blend of waxes are superior to single waxes in achieving satisfactory water repellency and other qualities. For example, a blend of paraffin wax with montan wax has been used.

Montan wax is a hard, fossil-plant wax extracted from certain types of lignite or brown coal. However, there is a major problem with montan wax. It is commercially available in only a few locations, including Amsdorf, Germany (the majority of montan wax coming from there), and in the Ione Basin near Ione in Amador County, Calif. Its rarity casts a shadow of doubt on its continued availability and makes it very expensive.

SUMMARY OF THE INVENTION

The present invention seeks to provide materials for imparting water repellency and other characteristics to wood products, as is described in detail further hereinbelow. The characteristics include, without limitation, water repellence or resistance, water absorption control, sizing control, dimensional stability, thickness swell control, edge sealing, density control, mechanical strength, internal bonding and elasticity control, stickiness control, preservation, mold control, and any combination thereof.

The term "wood" encompasses, but is not limited to, wood, HW (hard wood) CW (compressed wood), plywood, PB (particle board), FB (fiber board), LDF, MDF, HDF (low, medium, high density fiber board), OSB (oriented strandboard), PSL (parallel strand lumber), WB (wafer board), HB (hard board), DPH (dry process hardboard), WPH (wet process hardboard), and IB (insulating board) and any other engineered wood, wood composite, wood particle, reconstituted wood product or wood-type products. The term "wood particles" encompasses, but is not limited to, wood strands, chips, flakes, refined chips or flakes, fibers, webs of splintered wood formed by twisting or crushing billets of wood, or other forms of wood particles.

The term "strand" encompasses flakes, wafers or other suitable wood elements used in forming composite wood products, such as but not limited to, oriented strand board (OSB).

The term "adding" encompasses mixing, coating, dissolving, pouring, or any other action to make the suspension part of the finished wood product.

There is thus provided in accordance with an embodiment of the present invention an aqueous wax mixture including a hydrocarbon wax, and a water-repellant material selected from the group consisting of (a) an asphaltite, (b) a polyolefin copolymer, (c) a polyolefin synthetic wax, and (d) combinations thereof.

In accordance with an embodiment of the present invention the asphaltite is selected from the group consisting of uintaite, gilsonite, grahamite, and glance pitch. The polyolefin copolymer may be selected from the group consisting of ethylene acrylic acid copolymers, ethylene vinyl acetate copolymers and oxidized ethylene vinyl acetate copolymers. The polyolefin synthetic wax may be selected from the group consisting of polyethylene homopolymers and oxidized polyethylene homopolymers. The wax mixture may further include montan wax. The wax mixture may further include polyvinyl alcohol or cellulose derivatives such as hydroxyethyl cellulose, carboxymethyl cellulose or surfactants or emulsifiers or any combination thereof.

There is also provided in accordance with an embodiment of the present invention a method of manufacturing a water-resistant wood product including using a water and wax mixture with wood particles in a production process of wood products, wherein the wax mixture includes a hydrocarbon wax, and a water-repellant material selected from the group consisting of (a) an asphaltite, (b) a polyolefin copolymer, (c) a polyolefin synthetic wax, and (d) combinations thereof, and forming a water-resistant wood product. A water-resistant wood product may be made by this method.

DETAILED DESCRIPTION OF EMBODIMENTS

It has been surprisingly found that the water-repellant materials of the present invention achieve equivalent or superior water repellency, and other qualities, than wax alone, such as but not limited to, slack wax and/or significantly reduce the amount of wax used, thereby achieving significant cost savings.

It has been also surprisingly found that the water-repellant materials of the present invention achieve equivalent or superior water repellency, and other qualities, than several wax blends, such as but not limited to, a blend including slack wax and montan wax, thereby achieving significant cost savings and reducing dependency on montan wax supplies. It was also surprisingly found that blends of the water-repellant materials achieve equivalent or superior water repellency than wax alone and/or than several wax blends, such as but not limited to, wax blends that include slack wax and montan wax; and/or significantly reduce the amount of montan wax used, thereby achieving significant cost savings and reducing dependency on montan wax supplies. The water-repellant materials can reduce or even eliminate the use of PVA or cellulose derivatives if used for water repellency. The water-repellant materials can be used as any kind of mixture, such as but not limited to, emulsions or suspensions or molten blends. Emulsifiers, surfactants and/or dispersing agents, may be added to such emulsions, suspensions or blends as the case may be.

The present invention provides a wax composite for addition to wood or wood particle, comprising a hydrocarbon wax, such as but not limited to, slack wax, paraffin wax, carnauba wax, plant wax, and a water-repellant material, such as any one or combination from the following groups:

1. Asphaltite, such as but not limited to, uintaite, gilsonite, grahamite, and glance pitch 2. Polyolefin copolymers, such as but not limited to, ethylene acrylic acid copolymers, ethylene vinyl acetate copolymers or oxidized ethylene vinyl acetate copolymers.

3. Polyolefin synthetic waxes, such as but not limited to, polyethylene homopolymers or oxidized polyethylene homopolymers, As mentioned before, the water-repellant material may be combined with a wax, such as but not limited to, montan wax, and added to the wood or wood particles to be treated to achieve water repellency or other characteristics.

The term "blend" means blend, slurry mixture or any other term used in the wood industries to describe the mixture of the main raw material with additives and or additions.

EXAMPLES

The invention is further illustrated by the following non-limiting examples and comparative tests described herein below wherein the terms "part" and "percent" mean part by weight and percent by weight.

Tests were conducted to compare the water resistant properties of wood products treated with a) slack wax, b) aqueous mixtures of slack wax, montan wax, PVA and water and c) aqueous mixtures of slack wax, the water repellant materials, PVA and water. All aqueous mixtures contained the same water/materials ratio.

The aqueous mixtures were prepared by heating the mixture to the molten state, blending the materials together and then adding them to the wood blend to form board samples. Several types of wood were tested. Urea formaldehyde resin was used. All samples were prepared on a laboratory scale. The loading levels of each wax/mixture for the references and examples were 1.5%, 1% and 0.8% per dry strands. Board samples were prepared from the blends.

The board samples were then evaluated, using standard 24 hours tests for thickness swell (TS) tests and standard water absorption (WA) tests.

REFERENCE

A reference (reference 1) molten slack wax was used to produce board samples.

Another reference (reference 2) water and a mixture of slack wax, montan wax, and polyvinyl alcohol was prepared and used to produce board samples.

The solid contents of both references and examples were equal (slack wax percent of reference 1, and total solids of mixture percent of reference 2 and of all the examples were equal)

Example 1

Mixtures of materials of each of the groups, slack wax, and polyvinyl alcohol were prepared and used for samples production.

Example 2

A mixture of material from group 1, slack wax, material from group 3 and polyvinyl alcohol was prepared and used for samples production.

Example 3

A mixture of material from group 1, materials from group 2, slack wax and polyvinyl alcohol was prepared and used for samples production.

Example 4

A mixture of material from group 3, materials from group 2, slack wax and polyvinyl alcohol was prepared and used for samples production.

Example 5

A mixture of a small quantity of montan wax (ten times less than reference 2), slack wax, material from group 3 and polyvinyl alcohol was prepared and used for samples production.

At all loading levels, reference 1 performed worse than reference 2 and worse than examples 1-5.

At all loading levels, examples 1-5 performed equivalently or superior to that of reference 2

Examples 2 and 5 performed better than the references and the rest of the examples. Example 5 is an example of one of the synergetic effects of the invention—the blend of water repellant materials and montan wax has superior performance to that of montan wax alone. Example 2 is another example of the synergetic effects—the blend of water repellant materials has superior performance to that of montan wax alone.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. An aqueous wax mixture comprising:
   wood particles;
   water;
   a hydrocarbon wax;
   a polyolefin homopolymer; and
   an asphaltite comprising at least one of uintaite, gilsonite, grahamite, and glance pitch.

2. The mixture according to claim 1, wherein said polyolefin homopolymer is selected from the group consisting of polyethylene homopolymers and oxidized polyethylene homopolymers.

3. The mixture according to claim 1, further comprising montan wax.

4. The mixture according to claim 1, further comprising polyvinyl alcohol.

5. The mixture according to claim 1, further comprising a polyolefin copolymer.

6. The mixture according to claim 5, wherein said polyolefin copolymer is selected from the group consisting of ethylene acrylic acid copolymers, ethylene vinyl acetate copolymers and oxidized ethylene vinyl acetate copolymers.

7. A method of manufacturing a wood product comprising:
   using a water and wax mixture with wood particles in a production process of wood products, wherein said wax mixture comprises a hydrocarbon wax, a polyolefin homopolymer and a water-repellant material comprising an asphaltite comprising at least one of uintaite, gilsonite, grahamite, and glance pitch; and forming a wood product.

8. The method according to claim 7, further comprising adding a polyolefin copolymer to the wax mixture.

9. A wood product made by the method of claim 7.

* * * * *